US00RE44561E

(19) United States
(12) Reissued Patent
Hilt

(10) Patent Number: US RE44,561 E
(45) **Date of Reissued Patent: *Oct. 22, 2013**

(54) SYSTEM USING HOME GATEWAY TO ANALYZE INFORMATION RECEIVED IN AN EMAIL MESSAGE FOR CONTROLLING DEVICES CONNECTED IN A HOME NETWORK

(75) Inventor: Patrick Hilt, San Diego, CA (US)

(73) Assignee: Sony Deutschland GmbH, Cologne (DE)

( * ) Notice: This patent is subject to a terminal disclaimer.

(21) Appl. No.: 12/965,121

(22) Filed: Dec. 10, 2010

Related U.S. Patent Documents

Reissue of:
(64) Patent No.: 6,738,820
Issued: May 18, 2004
Appl. No.: 09/934,213
Filed: Aug. 21, 2001

U.S. Applications:
(63) Continuation of application No. 11/437,008, filed on May 18, 2006, now Pat. No. Re. 42,104.

(30) Foreign Application Priority Data

Aug. 23, 2000 (EP) ..... 00118087

(51) Int. Cl.
*G06F 15/16* (2006.01)

(52) U.S. Cl.
USPC ..... 709/229; 709/206; 709/223

(58) Field of Classification Search
USPC ..... 709/229, 223, 206, 220, 245; 368/10; 370/354, 352; 725/151, 119, 49; 710/15
See application file for complete search history.

(56) References Cited

U.S. PATENT DOCUMENTS 5,886,732 A * 3/1999 Humpleman ..... 725/49
5,961,594 A 10/1999 Bouvier et al.
6,327,610 B2 12/2001 Uchida et al.
6,510,454 B1 * 1/2003 Walukiewicz ..... 709/206
6,526,581 B1 2/2003 Edson (Continued)

FOREIGN PATENT DOCUMENTS

WO WO 92 22033 12/1992

OTHER PUBLICATIONS

Savit, Amendment of patent application with U.S. Appl. No. 09/934,213, filed Aug. 4, 2003, pp. 1-6.*

(Continued)

*Primary Examiner* — Le H Luu
(74) *Attorney, Agent, or Firm* — Frommer Lawrence & Haug LLP; William S. Frommer

(57) ABSTRACT

In order to allow controlling of a home network (5) from remote, a gateway (1) connecting the home network (5) to a communication network (3, 12) additionally comprises an e-mail module (6). The e-mail module (6) enables the gateway (1) to connect itself to an e-mail account (8) in order to transmit e-mails received by the e-mail account (8) via the communication network (3) to the gateway (1). The transmitted e-mails are processed by the gateway (1), information is extracted therefrom enabling the gateway (1) to carry out network controlling procedures. Status information and error messages are sent back by the gateway (1) to the user (13) in form of e-mails.

3 Claims, 1 Drawing Sheet

(56) References Cited

U.S. PATENT DOCUMENTS

| | | | | |
|---|---|---|---|---|
| 6,542,500 | B1 * | 4/2003 | Gerszberg et al. | 370/354 |
| 6,678,215 | B1 * | 1/2004 | Treyz et al. | 368/10 |
| 6,714,534 | B1 * | 3/2004 | Gerszberg et al. | 370/352 |
| 6,889,385 | B1 * | 5/2005 | Rakib et al. | 725/119 |
| 6,957,275 | B1 * | 10/2005 | Sekiguchi | 709/245 |
| 6,970,952 | B2 * | 11/2005 | Motoyama | 710/15 |
| 7,003,796 | B1 * | 2/2006 | Humpleman | 725/151 |
| 7,620,703 | B1 * | 11/2009 | Shteyn | 709/220 |
| 2001/0055299 | A1 * | 12/2001 | Kelly | 370/352 |
| 2002/0031120 | A1 | 3/2002 | Rakib | |

OTHER PUBLICATIONS

Larsen A K: "Network Management/Analysis" Data Communications, McGraw Hill. New York, US, vol. 26, No. 1, 1997, p. 116, 118, XP000659588.

* cited by examiner

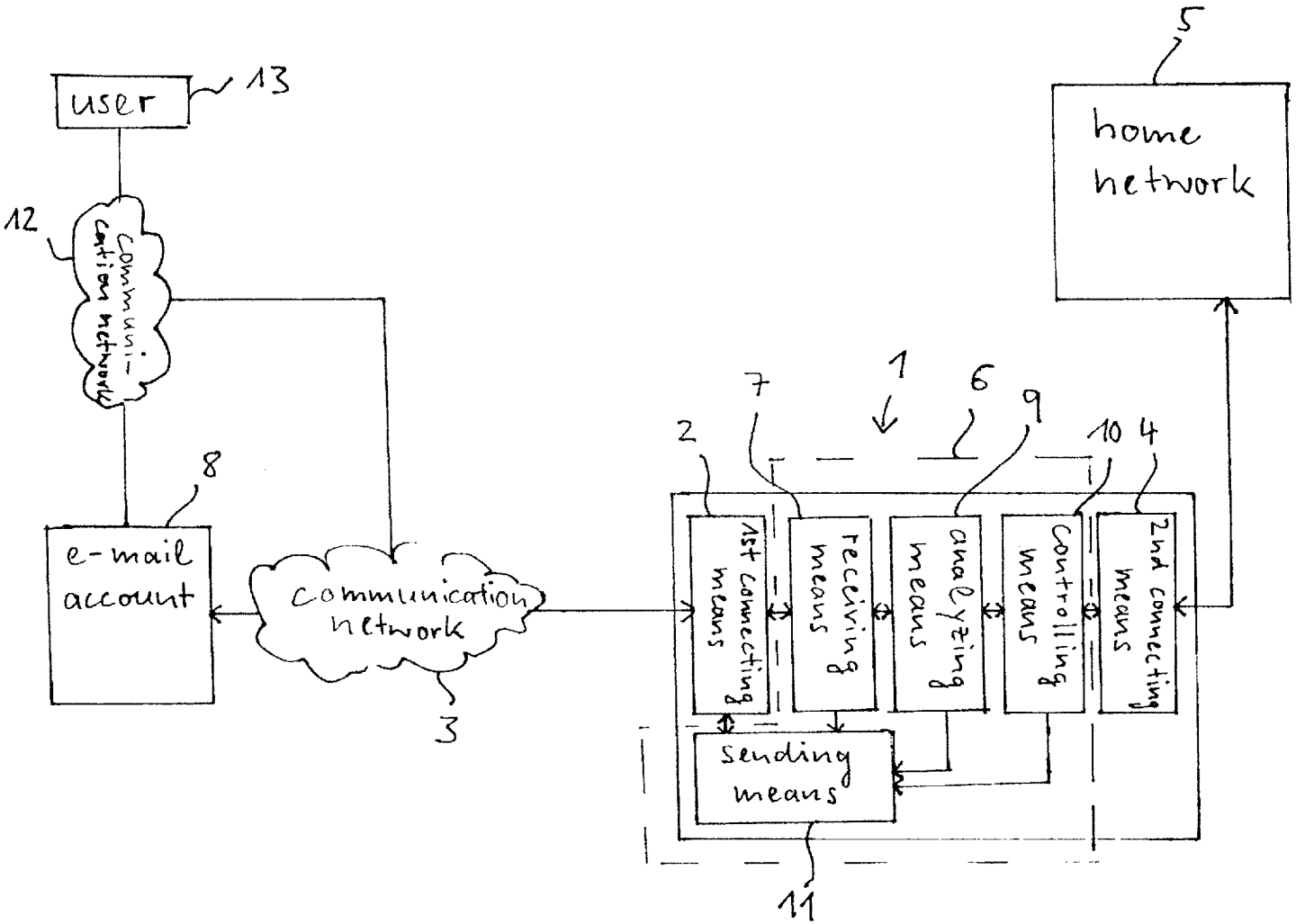
home network
5
2nd connecting means
4
10
controlling means
9
analyzing means
6
1
receiving means
7
1st connecting means
2
sending means
11
communication network
3
e-mail account
8
communication network
12
user
13

SYSTEM USING HOME GATEWAY TO ANALYZE INFORMATION RECEIVED IN AN EMAIL MESSAGE FOR CONTROLLING DEVICES CONNECTED IN A HOME NETWORK

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 6,738,820. The reissue applications are Ser. No. 11/437,008, the instant continuation application filed May 18, 2006 and a further reissue continuation application now U.S. Pat. No. Re. 42,104.*

BACKGROUND OF THE INVENTION

1. Field of the Invention

The present invention pertains to a method of remotely controlling a home network, the home network being accessible via a gateway, and an apparatus therefor.

2. Description of Related Art

A commonly used method for interconnecting and controlling home devices is to use home networking. Using such a home network, it is possible that any home device controls and communicates with any other home device. Further, it is possible to control these devices from remote.

To do this, it may be desirable to use the Internet as a communication network connecting the remote user to the home network. Such a connection can be realized by a gateway as an interface between the home network and the Internet, for example.

However, in such a case, it is necessary to have the gateway permanently connected to the Internet, which is expensive and represents a security hazard.

SUMMARY OF THE INVENTION

It is an object of the present invention to provide a method of controlling a home network from remote, which is low in cost and which shows a high standard of security.

To solve this object, the present invention provides a method of controlling a home network from remote, the home network being accessable via a gateway, which is characterized by the steps of transmitting information located in an e-mail account assigned to said gateway from said e-mail account to said gateway, analyzing said transmitted information and carrying out home network controlling procedures on the basis of said transmitted information by said gateway.

Further, the present invention provides a gateway connectable to a communication network, the gateway comprising a first connecting means to connect said gateway to said communication network, and a second connecting means connecting said gateway to a home network, characterized in that said gateway is connectable to an e-mail account via said communication network, said gateway including an e-mail module comprising receiving means connected to said first connecting means for receiving e-mails via said communication network, said receiving means being connected to analyzing means for extracting information from said e-mails received by said receiving means and for processing said extracted information, and controlling means connected to said analyzing means for controlling devices within the home network according to an output of said analyzing means.

Further preferred embodiments of this method and gateway according to the present invention defined in independent claims 1 and 17, respectively, are described in the respective subclaims.

An important aspect of the present invention is that all information needed by the gateway to control the home network is provided by an e-mail account which is connectable to the gateway. This information is at least temporarily stored in the e-mail account and may consist of e-mails or be included in e-mails which have been sent from a remote user to said account. Another possibility is that the e-mail account generates the information itself by using software programs available within the e-mail account, for example. These programs can be adjusted by a user so as to artificially generate e-mails and store them in the e-mail account, the e-mails containing the information to control the home network.

It may be desirable that the gateway connects itself to the e-mail account in order to carry out an e-mail scanning process. During this e-mail scanning process, the gateway in a first step finds out which e-mails stored in the e-mail account are of importance for controlling the home network. For example, the gateway may check if new e-mails have been sent to the e-mail account, and focus all further actions on this special sort of e-mails. In a second step, the e-mail scanning process may extract data from the e-mails selected in the first step. For example, the data contained in the subject headers of the selected e-mails are extracted. This extracted data is then transferred as the essential information needed by the gateway to control the home network to the gateway.

The described scanning process can also be done by the e-mail account itself, which connects after completion of the scanning process to the gateway to transfer the data obtained by the scanning process to the gateway.

The scanning process may be restricted to only checking if an arbitrary e-mail has been received by the e-mail account. For example, if the functionality of the gateway is restricted to switching on all lights and is properly programmed in advance to do this, the only event of receiving an arbitrary e-mail by the e-mail account is sufficient for starting this controlling procedure. Due to the restricted functionality no further information is needed. In such a case, the information transferred from the e-mail account to the gateway may merely consist of a predetermined signal, which is interpreted by the gateway to carry out the predetermined home network controlling procedures, which would mean switching on all lights in the example given above.

Alternatively, the information transferred from the e-mail account to the-gateway consists of parts of received e-mails or of complete received e-mails. It is also possible that the e-mail account converts the received or artificially generated e-mails into a form suitable to be processed by the gateway before sending these converted e-mails to the gateway.

The advantage of the above-described method is that no permanent connection between a remote user controlling the home network and the gateway is necessary. By using the e-mail-account as a "command buffer", the "connection" between the remote user and gateway is split into two independent parts, which makes it possible to establish each part of the connection only on demand or within predetermined time intervals. The first part of the connection is the communication network between the remote user and the e-mail account, the second part consists of the communication network between the e-mail account and the gateway. This reduces costs and increases security.

Another advantage is that the remote user can send home network commands at any time, since the e-mail account, preferably located at an internet service provider, is available all the time.

Another advantage is that e-mail services are widely available. If the user has a mobile phone which is able to convert SMS messages into e-mails, he can control the home network at any time from any point by sending SMS messages to the e-mail account, which are received by the e-mail account as e-mails.

Status information of the home network controlling procedures and error messages occurred during these procedures may be sent via the gateway to an e-mail account available for the remote user. Thus, the user can control if his commands sent in form of e-mails to the e-mail account have been properly processed by the gateway.

In the case that parts of e-mails or complete e-mails have been transmitted from the e-mail account to the gateway, the gateway analyzes the transmitted e-mails and extracts information therefrom. For example, the gateway extracts the information contained in the headers of the e-mails, as this information may contain task information, i.e. information which tells the gateway what to do with the rest of information contained in the e-mail. For example, the task information may contain the task "controlling the home video system". The gateway then knows that this e-mail is intended to control the home video system, and extracts controlling information needed therefore from the body of this e-mail. The controlling information contains additional information telling the gateway how to control the home video system in detail, for example.

If the extracted task information is sufficient to carry out the home network controlling procedure, the step of extracting controlling information may be left. For example, if the task information contains the command "switching on all lights", the gateway does not need any further information, and no controlling information is extracted from the e-mail.

To increase security, the gateway may process only such transferred e-mails which carry authenticating information. For example, the gateway may accept only such transferred e-mails which carry a special sender address. Other e-mails are ignored or deleted.

E-mails stored in the e-mail account which have already been scanned by the gateway or by the e-mail account, may be deleted after a predetermined period of time.

To further increase security, the e-mails may be encrypted by the remote user before sending them to the e-mail account, and decrypted either by the e-mail account or the gateway after having received them.

Another advantage of the present invention is that the home network can even be controlled if a firewall is used, which does not allow that HTTP passes the gateway for reasons of security. In such a case, a browser-based controlling of the gateway would not be possible, for example.

Further advantages and features of the present invention will be explained below in conjunction with the following drawing.

BRIEF DESCRIPTION OF THE DRAWINGS

FIG. 1 shows a preferred embodiment of a gateway in accordance with the present invention.

DETAILED DESCRIPTION OF PREFERRED EMBODIMENT(S)

In the following description, an exemplary preferred embodiment of a gateway for realizing the method described above will be given.

A gateway 1 comprises first connecting means 2 to connect the gateway to a communication network 3, and a second connecting means 4 connecting the gateway 1 to a home network 5.

According to the present invention, the gateway 1 further comprises an e-mail module 6. The e-mail module 6 comprises receiving means 7 for receiving information transmitted from an e-mail account 8, which is connectable with the gateway 1 via the communication network 3. The receiving means 7 is connected to the first connecting means 2, and also connected to an analyzing means 9 for extracting information from the e-mails received by the receiving means 7 and for processing the extracted information. The analyzing means 9 is also included in the e-mail module 6.

The e-mail module 6 further comprises controlling means 10 connected to the analyzing means 9 and the second connecting means 4 for controlling devices within the home network 5 via the second connecting means 4 based on information extracted from the e-mails by the analyzing means.

The receiving means 7 coordinates the transmission of information of the e-mail account 8 via the communication network 3 and the first connecting means 2. It can cause a modem or an ISDN device included in first connecting means 2 to dial up to the e-mail account 8, and has storage means (not shown) for storing received information.

The analyzing means 9, the controlling means 10, the receiving means 7 and the first connecting means 2 are connected to a sending means 11 to send status information or error messages to the sending means 11. The sending means 11 then converts the status information or the error messages into e-mails and sends them via the first connecting means 2 and the communication network 3, 12 to the user 13.

The sending means 11 may also send e-mails to the e-mail account 8. The user could then connect himself via the communication network 12 to the e-mail account 8 and read the error messages or status information stored as e-mails within the e-mail account 8.

What is claimed is:

[1. Method of controlling a home network (5) from remote, the home network (5) being accessable via a gateway (1), characterized by the following steps:

transmitting information located in an e-mail account (8) assigned to said gateway (1) from said e-mail account (8) to said gateway (1), analyzing said transmitted information and carrying out home network controlling procedures on the basis of said transmitted information by said gateway (1).]

[2. Method according to claim 1, characterized by an e-mail scanning process of said e-mail account (8), said information being transmitted to said gateway (1) being generated before said transmission according to a result of said e-mail scanning process.]

[3. Method according to claim 2, characterized by using said gateway (1) or said e-mail account (8) itself for said e-mail scanning process.]

[4. Method according to claim 3, characterized in that said e-mail scanning process of said e-mail account (8) is done in regular time intervals by said gateway (1).]

[5. Method according to claim 2, characterized by deleting such e-mails of said e-mail account (8) already scanned by said e-mail scanning process after a predetermined period of time.]

[6. Method according to claim 1, characterized in that said steps of transmitting said information is done by transmitting at least parts of e-mails.]

[7. Method according to claim 4, characterized in that said step of analyzing said transmitted e-mails comprises a step of extracting information of said transmitted e-mails and a step of judging whether said transmitted e-mails are intended to cause home network controlling procedures, said step of judging being at least partially based on said extracted information.]

[8. Method according to claim 7, characterized in that said step of extracting information comprises a step of extracting task information from the subject headers of said transmitted e-mails and a step of extracting controlling information from the bodies of said transmitted e-mails.]

[9. Method according to claim 8, characterized in that said step of judging whether said transmitted e-mails are intended to cause home network controlling procedures is based on said extracted task information.]

[10. Method according to claim 8, characterized in that said step of carrying out home network controlling procedures is based on said extracted controlling information.]

[11. Method according to claim 6, characterized by carrying out home network controlling procedures only on the basis of such transmitted e-mails which carry a special sender address.]

[12. Method according to claim 1, characterized in that said steps of transmitting said information is done by transmitting complete e-mails.]

[13. Method according to claim 1, characterized by sending e-mails to said e-mail account (8) by a remote user (13).]

[14. Method according to claim 13, characterized by encrypting at least parts of said e-mails before sending them by said remote user (13) to said e-mail account (8), and decrypting them by said gateway (1) after having transferred them to said gateway (1).]

[15. Method according to claim 1, characterized in that said gateway (1) sends status information and error messages as e-mails to a remote user (13).]

[16. Method according to claim 1, characterized by carrying out home network controlling procedures only on the basis of such transmitted information which carries authenticating information.]

[17. Gateway (1) connectable to a communication network (3), the gateway (1) comprising a first connecting means (2) to connect said gateway (1) to said communication network (3), and a second connecting means (4) connecting said gateway (1) to a home network (5), characterized in that said gateway (1) is connectable to an e-mail account (8) via said communication network (3), and includes an e-mail module (6) comprising receiving means (7) connected to said first connecting means (2) for receiving e-mails via said communication network (3), said receiving means (7) being connected to analyzing means (9) for extracting information from said e-mails received by said receiving means (7) and for processing said extracted information, and controlling means (10) connected to said analyzing means (9) for controlling devices within the home network (5) according to an output of said analyzing means (9).]

[18. Gateway (1) according to claim 17, characterized in that said receiving means (7) comprises a transferring means for transferring e-mails of said e-mail account (8) to said gateway (1).]

[19. Gateway (1) according to claim 17, characterized in that said e-mail module comprises a sending means (11) connected to said first connecting means (2) for sending e-mails from said gateway (1) to an e-mail account (8) of a remote user (13), said e-mails to be sent by said sending means (11) being generatable according to an output of said controlling means (10), said analyzing means (9) and said controlling means (10) by said sending means (11).]

*20. A method for remotely controlling respective ones of plural different devices connectable to a communication network, comprising the steps of:*

*establishing a connection via a gateway to a provider and scanning e-mails stored at said provider;*

*checking whether a new e-mail containing one of plural different predetermined signals is stored at said provider, said predetermined signals being interpreted to carry out respectively different predetermined procedures to control respective ones of said devices;*

*receiving at the gateway from said provider only a new e-mail containing said predetermined signal;*

*extracting said predetermined signal from said received e-mail; and*

*controlling said respective one device on the basis of said extracted predetermined signal by the gateway.*

*21. The method of claim 20, wherein said connection is established with an e-mail buffer at the provider in which said e-mail is stored so as to enable said checking.*

*22. The method of claim 20, wherein said step of checking is carried out at predetermined time intervals to determine whether new e-mail containing a predetermined command has been sent from a remote device.*

* * * * *